Patented Nov. 18, 1947

2,430,998

UNITED STATES PATENT OFFICE 2,430,998

ASPHALT COMPOSITION

Albert J. Shmidl, Greens Bayou Park, Tex., assignor to Standard Oil Development Company, a corporation of Delaware No Drawing. Application July 4, 1942, Serial No. 449,839

3 Claims. (Cl. 106—123)

This invention relates to road paving compositions and to the coating of mineral aggregates with bituminous compositions. More particularly, the invention relates to the preparation of a wetting agent for asphaltic compositions and their utilization in road paving compositions.

Imperfections in asphaltic pavements are commonly due to poor bonding between the mineral aggregate material and the asphaltic binder. The bonding of an asphalt to a mineral aggregate is largely a surface tension effect, which is particularly significant when the asphalt is applied at atmospheric temperatures in an emulsified or solubilized state. If the surface tension between asphalt and air is very high, the asphalt will not penetrate the dust film or the pores near the surface of the aggregate material. Also, if the surface tension between the asphalt and the aggregate material is also high, the asphalt will not flow or spread evenly over the surface of the aggregate. A particular problem, when the asphalt is applied in aqueous emulsion form or when the mineral aggregate is damp, is to be sure that the asphalt has a greater affinity than water for the aggregate material. Particular difficulties in this regard occur when the mineral aggregates are highly siliceous in nature and are, therefore, largely hydrophilic in character. The present invention resides in the preparation of an asphaltic composition which has good surface tension properties in regard to air, water and aggregate materials commonly employed in road paving compositions.

In the prior art, two approaches are evident in endeavoring to overcome bonding difficulties between bituminous compositions and mineral aggregate. In one field of development compositions are prepared for treating the mineral aggregate prior to the application of the bituminous composition. The other field of development is to improve the surface tension effects of the asphalt by the incorporation of surface active agents. The present invention is a development in this latter field based upon the discovery of a new and highly effective surface active agent for asphaltic compositions particularly those applied at atmospheric conditions in emulsified or solubilized forms. It has been found that if asphaltic compositions contain a small percentage of the wetting agent of this invention, a composition is prepared which satisfactorily coats all types of mineral aggregate materials even under conditions which normally are considered adverse, and there is obtained a highly desirable road paving composition.

In the preparation of paving compositions two types of mineral aggregates must be distinguished. One type of aggregate is preferentially wetted by asphalt rather than by water. This group is conveniently termed the hydrophobic type. Examples of this group are limestone, dolomite, oyster and clam shells. The other type of aggregate, highly siliceous in character, and suitably termed the hydrophilic aggregates, is characterized by being preferentially wetted by water rather than asphalt. Examples of this group are porphyritic gravel and sand. When this latter type is coated with asphalt there is a tendency for the coating to peel off, especially when the application has been made by means of an aqueous asphaltic emulsion or when the surface is exposed to severe conditions of moisture.

While the highly siliceous materials are disadvantageous as regards their wetting characteristics toward asphalt, aggregates of this type are more extensively employed in paving compositions since they are more largely available and they have the added characteristics of being harder, more resistant to compresison and of having better stability to wearing effects than the relatively non-siliceous materials. Even more extensive use of the highly siliceous materials is definitely limited by their inability to be satisfactorily coated by asphalt. It is a particular object of this invention to overcome such disadvantages of the highly siliceous aggregates by employing asphaltic compositions of low surface tension characteristics, and which are, therefore, conveniently adapted for the preparation of road paving compositions of good wearing characteristics. As corollary to this, the asphaltic compositions of this invention are also suitable for use with dampened mineral aggregates of all types, and the development therewith of satisfactory paving compositions under such conditions as are usually considered adverse to the preparation of a good surface.

Further objects of the invention will become apparent on reading the following description:

It has been found that an asphaltic composition for use in connection with hydrophilic mineral aggregates is prepared by incorporating in petroleum asphalt or coal tar pitches a small quantity of a particular type surface active agent. This surface active agent is added in amounts between 0.1% and 5% by weight of the asphaltic composition and preferably in amounts from 0.5% to 3% by weight. The addition agent is prepared by reacting strong sulfuric acid with the resinous products derived from a residue obtained in the manufacture of paper pulp from slash pine, such as Southern pine obtained in the Gulf Coast States.

In preparing paper pulp, the pine wood chips are ordinarily heated under pressure with an aqueous solution of sodium sulfide and an alkaline reacting compound containing sodium, such as sodium carbonate or sodium hydroxide. The treatment usually results in the formation of a black liquor which is separated from the pulp. The black liquor obtained from the highly resinous pine wood contains a large amount of resinous soap. This material is separated from the pulp and the black liquor by suitable means, such as decanting or filtering, is washed with a sodium sulfate solution, and is then acidified with a weak mineral acid such as dilute sulfuric acid to release a viscous sticky oil which is partly resinous and partly fatty products. This viscous sticky oil constitutes the raw material from which the wetting agent of the invention is prepared.

The wetting agent is prepared by treating the viscous sticky oil with about 30% to about 50% by volume of 90% to 100% sulfuric acid. The reaction is started at atmospheric conditions of temperature, generally about 70° F. to 90° F., with considerable darkening of the mixture and evolution of heat. The acid added to the viscous oily material apparently reacts substantially completely.

The black viscous reaction product has been found equally useful as an asphalt wetting agent either in the acid condition or after neutralization with a suitable base, such as sodium hydroxide or sodium carbonate.

In order to illustrate the effectiveness of the surface active agent of the invention in preparing asphaltic compositions suitable for road building, a medium curing cut-back asphalt was prepared by mixing a petroleum asphalt with a petroleum solvent heavy naphtha of medium volatility. The asphalt employed in this experiment had a penetration of 141 at 77° F.; while the petroleum solvent was characterized by the following inspections:

TABLE I

| | |
|---|---|
| Gravity, °A. P. I. | 45.0 |
| Initial boiling point, °F | 340 |
| Final boiling point, °F | 535 |

The asphalt and solvent were mixed in the ratio of 80% by volume of asphalt and 20% by volume of the heavy naphtha to give a cut-back asphalt having the following characteristics:

TABLE II

| | |
|---|---|
| Gr. °A. P. I. | 16.1 |
| O. C. flash, °F | 170 |
| Furol viscosity at 140° F., sec | 453 |

*Cut-back distillation*

| | |
|---|---|
| Per cent at 437° F | 0.5 |
| Per cent at 600° F | 14.5 |
| Per cent at 680° F | 18.5 |
| Penetration on residue at 77° F | 141 |

The cut-back asphalt whose characteristics have been described in Table II was divided into two portions. To one portion was incorporated 2% by weight of an acidic wetting agent prepared by reacting the resinous by-product material from pine wood pulp manufacture with 40% by volume of 90% by weight sulfuric acid. The other portion contained no wetting agent. The two portions of cut-back asphalt, with and without wetting agent, were then employed to treat various types of aggregates. Three separate gravels from different localities in Texas were employed as aggregate along with crushed limestone. These gravels were of the hydrophilic type and largely of smooth quartz-like particles eroded from distant sources. To standardize the testing, the aggregates were screened to pass a one-half inch screen and be retained upon a one-quarter inch screen before mixing with the asphalts as follows:

Two hundred grams of aggregate containing 2% by weight of water were stirred with 12 grams of asphalt for one minute at a temperature of about 90° F. The coated aggregate was then dried for about one hour before submerging in water at a temperature between about 70 to 90° F. The amount of asphalt coating on the aggregate was visually estimated after elapse of one and twenty hours. The inspections on the coated aggregate with and without addition agent prepared in accordance with this invention are as follows:

TABLE III

*Aggregate containing 2% water*

| | Crushed Limestone | Washed River Gravel | Romayer, Texas, Gravel | Fort Worth, Texas, Gravel |
|---|---|---|---|---|
| Asphalt: | | | | |
| Coverage Initial, per cent | 85 | 75 | 95 | 95 |
| 1 Hour | 80 | 65 | 80 | 85 |
| 20 Hours | 10 | 10 | 15 | 10 |
| Asphalt with 2% Wetting Agent: | | | | |
| Coverage Initial, per cent | 100 | 100 | 100 | 100 |
| 1 Hour | 100 | 100 | 100 | 100 |
| 20 Hours | 80 | 40 | 25 | 80 |

These tests were designed to show the "stripping resistance" of the aggregate when exposed to extreme conditions of inundation by water occasionally encountered in road building.

It will be observed from the data presented in Table III that the coverage obtained with the improved asphalt composition is considerably in excess of that obtained with asphalt containing no wetting agent. It may also be observed that the preferred wetting agent improved the characteristics of the asphaltic composition when employed with either hydrophilic or hydrophobic types of mineral aggregates.

While this invention has been illustrated by coating of gravel and limestone with the asphalt containing the preferred wetting agent, it is to be understood that other types of aggregate such as oyster and clam shells, silica, and porphyry and other similar suitable materials may be employed with equal success.

It will be realized that the ratios of asphalt to aggregate employed in a road building composition utilizing this invention will vary in accordance with the type of road surface desired and the asphalt and aggregate employed. When employing gravel as the aggregate, generally about 91 to 96 parts of aggregate to about 4 to 9 parts of asphalt have been found to give good results. However, other proportions may be used to give asphalt compositions of different characteristics. The ratios of aggregate to asphalt given herein are presented by way of illustration and not by way of limitation. This invention is, therefore, not to be limited by any examples which have been given for more complete understanding of the invention.

What is claimed is:

1. An asphaltic composition adapted for coating hydrophilic type mineral aggregates comprising a petroleum asphalt to which is added in a minor amount a compound prepared by heating with strong sulfuric acid, the acidified resinous material obtained by heating pine wood with an aqueous solution of sodium sulfide and an alkaline reacting compound containing sodium.

2. A composition adapted for coating hydrophilic type mineral aggregates comprising a petroleum asphalt to which is added in a minor amount a compound prepared by treating with strong sulfuric acid, the acidified resinous material obtained by heating pine wood with an aqueous solution of sodium sulfide and an alkaline reacting compound containing sodium and then neutralizing the reaction product.

3. An asphaltic composition adapted for coating highly siliceous mineral aggregates, comprising a cut-back petroleum asphalt containing 80% by volume of asphalt and 20% by volume of heavy naphtha to which is added about 2% by weight of an acidic compound prepared by reacting with 40% by volume of 90% sulfuric acid the resinous by-product obtained from treating the pine wood with an aqueous solution of sodium sulfide and sodium hydroxide.

ALBERT J. SHMIDL.

REFERENCES CITED

The following references are of record in the file of this patent:

UNITED STATES PATENTS

| Number | Name | Date |
|---|---|---|
| 2,286,244 | Whitacre | June 16, 1942 |
| 2,049,772 | Hepburn | Aug. 4, 1936 |
| 2,326,387 | Nill | Aug. 10, 1943 |
| 2,290,583 | Dieger | July 21, 1942 |

FOREIGN PATENTS

| Number | Country | Date |
|---|---|---|
| 369,985 | Great Britain | 1932 |
| 310,541 | Germany | Dec. 19, 1915 |

OTHER REFERENCES

Chemistry & Industry, May 23, 1942, pages 233 and 234.

Industrial & Engineering Chemistry, vol. 33, No. 2, pages 197 to 200.